United States Patent [19]
Paley

[11] 3,808,050
[45] Apr. 30, 1974

[54] CLARIFICATION AND TREATMENT OF SUGAR JUICE

[76] Inventor: Lewis A. Paley, 614 Adams St., Aurora, Ill. 60505

[22] Filed: July 1, 1965

[21] Appl. No.: 482,005

[52] U.S. Cl.................................. 127/55, 127/61
[51] Int. Cl............................................. C13d 3/12
[58] Field of Search............. 127/41, 44, 46, 48–58; 210/40

[56] References Cited
UNITED STATES PATENTS

| | | | |
|---|---|---|---|
| 1,314,203 | 8/1919 | Mumford | 127/46 |
| 1,579,171 | 3/1926 | Zoul | 127/55 UX |
| 1,981,877 | 11/1934 | Pierce | 127/55 UX |
| 2,557,996 | 6/1951 | Peterson | 127/44 |
| 2,954,305 | 9/1960 | Grosvenor | 127/55 |
| 2,405,315 | 8/1946 | McBride | 127/48 |
| 2,776,229 | 1/1957 | Peterson | 127/48 |
| 626,036 | 5/1899 | Putzeys | 127/59 |
| 240,721 | 4/1881 | Jager | 127/59 |
| 3,328,322 | 6/1967 | Kreibich et al. | 262/17.2 |
| 3,329,632 | 7/1967 | Bryner | 262/17.2 |
| 2,647,058 | 7/1953 | Schapiro | 99/105 |
| 2,831,773 | 4/1958 | Geisler | 99/105 |
| 2,578,366 | 12/1951 | Mills | 252/367 |
| 2,945,819 | 7/1960 | Mazzoni | 252/367 |

FOREIGN PATENTS OR APPLICATIONS

| | | | |
|---|---|---|---|
| 18,906 | 5/1928 | Netherlands | 127/50 |
| 249,191 | 3/1926 | Great Britain | 127/52 |

OTHER PUBLICATIONS

F. W. Zerban Int. Sug. J. 1920, pp. 332–333, 643–646, 699–702.
P. Honig "Principles of Sugar Technology" N.Y. 1953, pp. 449–450, 492–495, 501–503, 560, 572–573, 596–598.
H. Bessemer "A New System . . . Sugar" London 1852, p. 21.

*Primary Examiner*—Morris O. Wolk
*Assistant Examiner*—Sidney Marantz

[57] ABSTRACT

Clarification and treatment of sugar juice, and production of pure, direct white sugar, beverage, liquid sugar, edible syrup or molasses, and certain valuable by-products from the juice.

2 Claims, 2 Drawing Figures

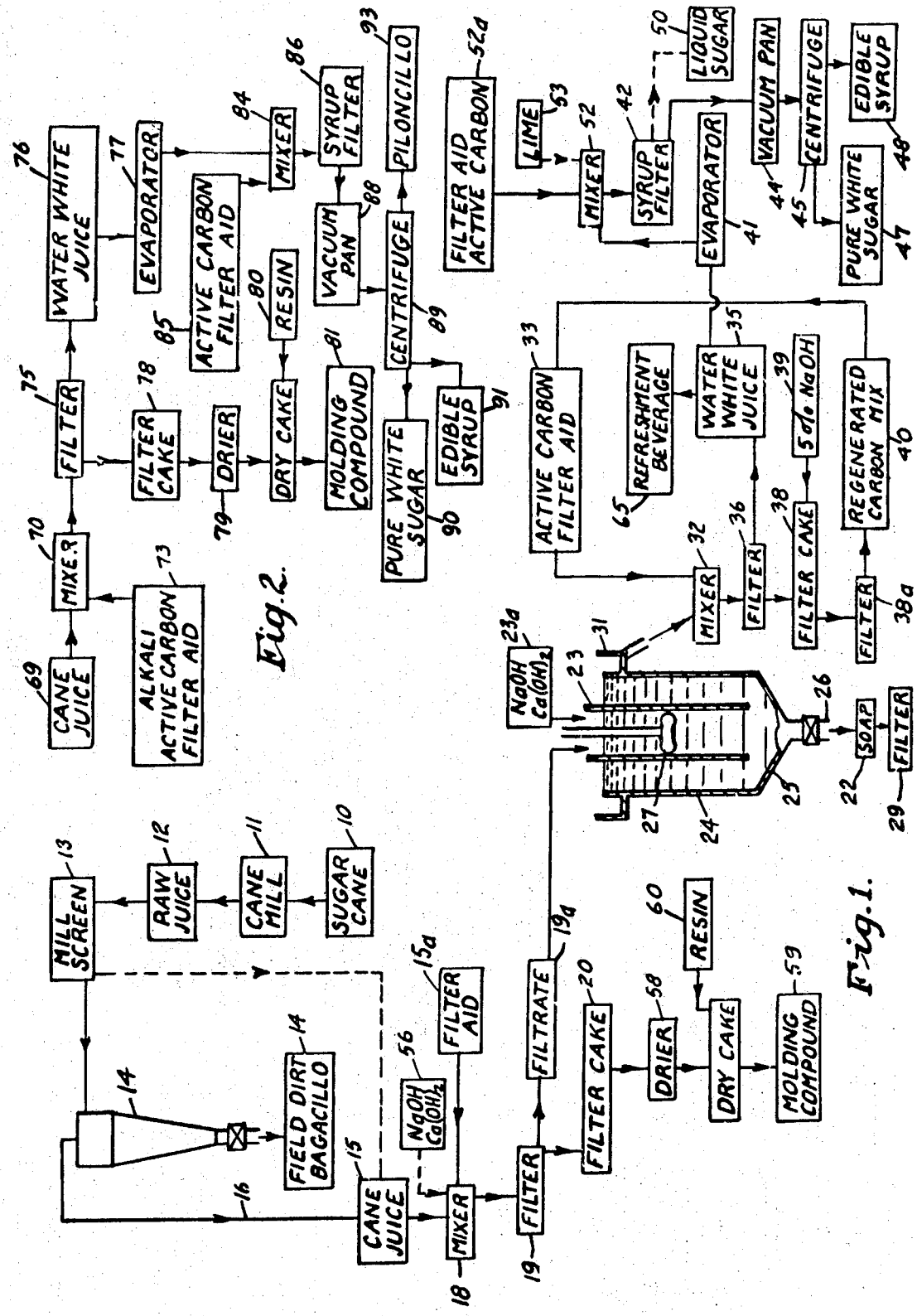

CLARIFICATION AND TREATMENT OF SUGAR JUICE

Sugar cane juice directly from the mill screen contains field dirt, cane wax, fatty acids, bagacillo and other impurities. This juice has a temperature of 20° to 40°C which is room temperature. The juice streams from the pressing rolls fall through the air several feet and the juice comes to room temperature. No artificial heating of the juice is needed or desired. This fresh juice will have a pH of 5.2 to 5.8. There is a natural cleavage in the fresh juice between sugar and non-sugar impurities and if this cleavage is not disturbed by process conditions, the impurities may be removed from the juice largely by physical means so that water white juice is produced containing mostly sugar and water. This water white juice is then evaporated to produce pure white sugar by crystallization, or liquid sugar. By-products of commercial value are produced from the impurities removed from the juice.

In the conventional process, the cane juice from the mill screen is heated to boiling and limed. The cane wax which has a melting point of 175°F., melts when the juice is heated and disperses throughout the juice. Other impurities, such as fatty acids and colored bodies, also melt and disperse throughout the juice. Mud is separated from the juice by settling clarifiers, and the resulting "clarified" juice is almost black. The juice has been ruined by the premature heating. This "clarified" juice is evaporated and inevitably produces the raw sugar and black strap molasses of commerce. This raw sugar is usually shipped to a distant refinery where it is remelted and reprocessed to produce white sugar which is sold to the consumer. The black strap molasses contains 30 percent sucrose which cannot be crystallized and 30 percent natural invert sugar, all of which is largely wasted due to the low price of black strap molasses. The entire process is inefficient and wasteful.

Cane sugar juice has always been considered non-filterable because of the highly gelatinous impurities which it contains. However, I have found that cane juice directly from the mill screen may be readily filtered with a high flow rate if sufficient filter aid (diatomaceous earth) is used. This filtration removes many of the impurities contained in the juice, such as field dirt, cane wax, a tarry matter, bagacillo, etc., which are found in the filter cake. Some of the fatty acids pass through the filter so that the filtrate will still have a pH of about 6.0. The sodium soaps of these fatty acids are mostly insoluble in a slightly alkaline solution, so that the sodium soaps precipitate and may be removed from the juice by the addition of NaOH or lime to a pH of 6.8 to 8.5, and by settling and filtration. The juice is now mixed with powdered active carbon and optionally filter aid and filtered to produce a water white juice. This water white juice may be heated for sterilization and to coagulate albumin, and evaporated in the conventional way to produce pure white direct sugar and light colored edible molasses.

An object of this invention therefore is to produce direct white pure sugar or liquid sugar directly from the cane juice without refining, this sugar preferably polarizing 100 percent.

Another object of the invention is to clarify cane juice from the mill screen to a water white clarity before heating said juice.

Another object of the invention is to remove impurities in cane juice in steps so as not to prevent filtration by an accumulation of gelatinous materials.

Another object of the invention is to clarify cane juice without destroying the natural cleavage between sugar and impurities.

Another object of the invention is to provide a process of treating the juice in which the field dirt is first optionally removed from the juice by cyclone separation or by settling prior to final clarification.

Another object of the invention is to provide a process or method of producing liquid sugar by evaporating said juice to water white condition at a pH substantially below 7.0 to invert part of said sugar.

Another object of the invention is to clarify unheated cane juice by physical means.

Another object of the invention is to produce new products from cane juice such as carbonated beverage having a delightful maple flavor.

Another object of the invention is to produce a molding plastic material from impurities removed from the cane juice.

A still further object of the invention is to provide other by-products of value from the impurities removed from the cane juice; also to improve methods of treating sugar juice in other respects hereinafter specified and claimed.

Reference is to be had to the accompanying drawing forming a part of this specification, in which FIG. 1 is a flow sheet of the improved process, dotted lines indicating optional ways of carrying out the process, and FIG. 2 is a flow sheet of a simplified form of the process.

Referring to the drawing by numerals, the sugar cane 10 is run through the conventional roller grinding mill 11 which squeezes the cane juice 12 from the residual bagasse, at room temperature. The juice then passes through a mill screen 13 of 40 to 60 mesh, the screen being of the scraper type to avoid plugging up. In rainy weather, the sugar cane 10 brought in from the field will contain considerable field dirt which remains in the cane juice. This field dirt and bagacillo 14 may be eliminated from the juice by pumping the juice under 30 to 100 p.s.i., such as 40 p.s.i. tangentially through a conventional cyclone separator 14, the partly clarified juice 15 passing upwardly through a pipe 16 from the separator, and field dirt and bagacillo passing downwardly from the bottom of the separator 14.

The unheated cane juice 15 at substantially room temperature is mixed with filter aid 15a (diatomaceous earth) in a mixer 18 using about one-fourth to 1 liter, such as one-half liter of filter aid to 40 liters of juice. Chlorine gas or solution may be optionally added to the juice in mixer 18 to kill bacteria and sterilize the juice. The juice is now pumped through a pressure filter 19 at 20–100 p.s.i., such as 65 p.s.i., where the filter aid and many of the impurities in the juice, such as cane wax, bagacillo, and some of the fatty acids are removed. A vacuum drum belt filter may also be used for this purpose. The filter cake 20 from the filtration operation contains a tarry liquid of unknown composition which may be isolated by salting out with acetone in a manner to be described. The filtered juice will have a pH of about 6.0 if the pH of the fresh juice is 5.2 to 5.8. The acidity of this filtered juice is due to the presence of organic acids. These organic acids may be precipitated as soaps by neutralizing the juice 15 to a pH of 6.8 to 8.5, such as 7.0 pH, by the addition of an alkaline material such as NaOH or lime, in which case the soaps will be removed by filter 19 and will be found in the filter cake 20. However, since these soaps are of a gelatinous nature, it is desirable but not essential, to neutralize the juice after the juice passes the filter 19 in order to maintain a high flow rate in filter 19.

If the neutralization of the juice is postponed until after the juice passes the filter 19, a separation of different kinds of fatty acids is effected, some in the filter cake 20 and the rest in the soap precipitate 22. The filtrate 19a from filter 19 may be passed into the top of an open cylinder 23 of a settling tank 24 having a conical bottom 25 and a valve controlled bottom pipe 26 for discharging the soap precipitate 22 from said settling tank 24. NaOH or lime 23$_a$ are also optionally introduced into the top of cylinder 23 to be mixed with the juice by a motor driven propellor 27 so as to raise the pH of the juice to 5.8 to 8.5 and precipitate the soap 22. The soap precipitate 22 may be filtered in filter 29 to free it from most of the juice, said juice being returned to the system. The soap 22 may be mixed with soaps of other fatty acids to make powdered or cake detergents or may be used for other commercial purposes, such as greases.

The clarified juice from clarifier tank 24 overflows the top of said tank 24 into a launder 31 and then flows to a mixer 32. Active carbon and optionally filter aid 33 are continuously introduced into the mixer 32 to remove the last of colored material and produce water white juice 35. The juice mixture in mixer 32 is pumped through a pressure filter 36 at 30 to 100 p.s.i. such as 65 p.s.i. to produce the water white juice 35 and filter cake 38. The filter cake 38 is regenerated for further cycling and use by mixing 5 percent solution of NaOH 39 with the cake and filtering in filter 38a. Residual NaOH in the regenerated mix 40 will help in neutralizing any acidity in the juice to which it is added. The filter cake 38 may also and preferably be regenerated to active carbon by calcination of the filter cake 38 as disclosed in my copending application Ser. No. 385,970, filed July 29, 1964, of which this application is a continuation in part. The filtrate from the regenerated mix may be mixed with acetone in excess to precipitate a by-product in the form of a tarry liquid of unknown composition. The regeneration of the filter cake 38 should be done at room temperature since at elevated temperatures the silicious filter aid has a tendency to dissolve in the 5 percent NaOH solution.

The water white juice 35 is heated to sterilize the juice and to coagulate albumin which is removed, and is then run into a vacuum evaporator 41 where it is evaporated to a syrup of 50° to 70° Brix such as 65° Brix for the production of pure white sugar. It is preferable to filter this syrup hot by mixing it with powdered active carbon and filter aid 52a and pumping it through a pressure filter 42 to remove color and any sediment which might have been formed by the evaporation. This syrup from filter 42 is run into a vacuum pan 44 where the evaporation is continued to crystallize out the white sugar. The massecuite from vacuum pan 14 is transferred to a centrifuge 45 where the white sugar 47 is separated from edible syrup 48 which has a light color and a fine flavor resembling maple syrup. The white sugar 47 is dried and is ready for bagging and marketing.

If liquid sugar 50 is to be made, the juice may be left at its original pH of about 6.0 or 6.5 such as 6.0 pH so that inversion takes place during the evaporation in evaporator 41 to produce a final invert sugar content in the liquid sugar of about 50 percent to prevent crystallization of sucrose in the container. For the production of liquid sugar, the syrup from evaporator 41 is run into a mixer 52 and lime or NaOH 53 is added to bring the pH up to 6.8–8 such as 7.0 pH. This neutralized syrup is then pumped hot under pressure through the pressure filter 42 to produce the liquid sugar 50.

In times of dry weather when the cane from the field is clean, the cyclone separator may be by-passed and the cane juice run directly from the mill screen 13 to the mixer 18. If it is desired to by-pass the settler 24, NaOH or lime 56 may be added to the juice in mixer 18 to a pH of 6.8 to 8.5 and the resulting soap 22 will be removed in filter 19. The water white juice 35 may be heat sterilized and bottled to be served as a refreshment beverage 65 of delightful maple flavor. The juice may be carbonated with carbon dioxide if desired. Flavoring materials may be added to this cane juice before bottling.

The filter cake 20 from filter 19 may be dried in dryer 58 to form a molding plastic material 59. This dried cake is preferably mixed with powdered phenol-formaldehyde resin 60 or other thermosetting or thermoplastic resin in the proportion of one part by weight of resin to 5 to 15 parts, such as 8 parts of filter cake. The mixture may be ground to mix it to a powder and is ready for molding. The molding powder produces a copolymer by the combined simultaneous application of heat and pressure in a closed metal mold to produce a molded article comparable to Bakelite. The cane wax and fatty acids in the mix act as mold lubricants to insure easy ejection of the molded pieces from the mold. The filter aid and bagacillo in the mix act as fillers. The production of molded articles from the filter cake 20 offers a profitable way of utilizing this filter cake without further processing, so as to more than say for the cost of processing the sugar juice. The dried filter cake 20 may be alternately extracted with heptane, hexane or acetone to isolate the light colored cane wax from the extract by evaporation. The residue cake may also be used for a plastic. The filter cake 20 may also be mixed with 5% NaOH to dissolve by-product material from the filter cake 20. The NaOH solution may be mixed with an excess of acetone to salt out a tarry liquid by-product of unknown composition. Filtration of the juice may also be used instead of the settling apparatus 24.

In operation with factory conditions favorable, the simplest form of the process shown in FIG. 2. will be used. The cane juice 69 from the mill screen will be run to mixer 70. An alkaline material such as NaOH or lime will be optionally introduced into mixer 70 to bring the pH of the juice to 6.8 to 8.5. Active carbon and optionally filter aid 73 will then be added to mixer 70, preferably in slurry form suspended in clarified juice. When mixing is complete the juice mixture will be filtered in filter 75 to produce water white juice 76 in less than twenty minutes time to prevent bacterial action. This water white juice may then be heated to coagulate albumin which is removed from the juice and to sterilize the juice and is then run to evaporator 77 to be evaporated to a syrup. I would state in conclusion that while the examples illustrated and described constitute practical embodiments of my invention, I do not wish to be limited to these details, since manifestly the same may be considerably varied without departing from the spirit of the invention as defined in the appended claims. The filter cake 78 from filter 75 will then be dried in drier 79, mixed and ground with powdered resin 80 and used as a molding compound. By the simultaneous application of heat and pressure in a closed metal mold, the compound has a value which will more than pay for the cost of processing the sugar juice. This molding compound will also contain the spent carbon used in clarifying the juice. The syrup from evaporator 77 is run into a mixer 84 and a slurry of active carbon and filter aid 85 is also run into mixer 84 and then pumped hot through a syrup filter to remove traces of color and sediment. The syrup from filter 86 is evaporated further in vacuum pan 88 and the massecuite is run into centrifuge 89 to separate pure white direct sugar from edible syrup or molasses 91.

In the short process, only one filtration of the juice is required. The active carbon in the filter cake 78 has the surprising effect of insolublizing the cane wax in the filter cake so that the cane wax is insoluble in a solvent, such as heptane, hexane or acetone. The cane wax in filter cake 20 which contains no carbon, may be readily extracted with a solvent. The filter cake 78 may be regenerated by dissolving impurities with a 5 percent NaOH solution, and said regenerated cake may then be recycled.

Piloncillo 93 may be made from the massecuite in the centrifuge by operating the centrifuge 89 at about one half the normal speed so as to remove about one half the syrup from the granulated sugar crystals. The resulting mass of sugar crystals, and some syrup, is introduced into piloncillo molds to cool down to solid piloncillo. The piloncillo is a conical shaped confection sold in some countries as a substitute for sugar. Other shapes may be molded if desired. By removing some of the syrup, the piloncillo will have sufficient rigidity to resist distortion in hot tropical countries. The piloncillo or other confections may be coated with chocolate if desired.

Having thus described the invention, I claim as new and desire to secure by Letters Patent:

1. The method of treating fresh, unheated cane juice, which consists in adding an alkaline material from the group consisting of lime and NaOH to said juice to raise the pH of said juice to 6.8–8.5, mixing active carbon and filter aid with said juice, filtering said juice to produce water white juice, evaporating said water white juice to a syrup, hot filtering said syrup in the presence of active carbon and filter aid, and further evaporating said filtered syrup to produce white sugar and edible syrup.

2. The method of treating fresh, unheated cane juice, which consists in mixing active carbon with said juice, filtering said juice to produce water white juice, evaporating said water white juice to a syrup, hot filtering said syrup in the presence of active carbon, and further evaporating said syrup to produce white sugar and edible syrup.

* * * * *

UNITED STATES PATENT AND TRADEMARK OFFICE
CERTIFICATE OF CORRECTION

PATENT NO. : 3,808,050
DATED : April 30, 1974
INVENTOR(S) : Lewis A. Paley

It is certified that error appears in the above—identified patent and that said Letters Patent is hereby corrected as shown below:

The term of this patent subsequent to September 30, 1989, has been disclaimed.

Signed and Sealed this

Fifteenth Day of April 1980

[SEAL]

Attest:

SIDNEY A. DIAMOND

Attesting Officer     Commissioner of Patents and Trademarks